United States Patent
Krigsman et al.

(10) Patent No.: US 11,236,283 B2
(45) Date of Patent: Feb. 1, 2022

(54) ALKYLIMINODERIVATIVES FOR USE IN DIESEL FUEL EMULSIONS

(71) Applicant: NOURYON CHEMICALS INTERNATIONAL B.V., Arnhem (NL)

(72) Inventors: Joakim Krigsman, Sater (SE); Dennis Selse, Myggenas (SE); Tobias Stein, Durham (GB); Sorel Muresan, Stenungsund (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 17/053,612

(22) PCT Filed: May 3, 2019

(86) PCT No.: PCT/EP2019/061348
§ 371 (c)(1),
(2) Date: Nov. 6, 2020

(87) PCT Pub. No.: WO2019/215023
PCT Pub. Date: Nov. 14, 2019

(65) Prior Publication Data
US 2021/0230492 A1    Jul. 29, 2021

(30) Foreign Application Priority Data
May 8, 2018  (EP) .................................. 18171155

(51) Int. Cl.
*C10L 1/32*    (2006.01)
*C10L 1/222*   (2006.01)
*C10L 10/02*   (2006.01)

(52) U.S. Cl.
CPC ............. C10L 1/328 (2013.01); C10L 1/2222 (2013.01); C10L 10/02 (2013.01); *C10L 2200/0295* (2013.01); *C10L 2200/0446* (2013.01); *C10L 2250/082* (2013.01); *C10L 2270/026* (2013.01); *C10L 2290/24* (2013.01)

(58) Field of Classification Search
CPC ........ C10L 1/328; C10L 1/2222; C10L 10/02; C10L 2200/0295; C10L 2200/0446; C10L 2250/082; C10L 2270/026; C10L 2290/24; Y02E 20/14
See application file for complete search history.

(56) References Cited

U.S. PATENT DOCUMENTS

| | | | | |
|---|---|---|---|---|
| 3,025,239 A | * | 3/1962 | Sheldahl | C10L 1/2437 508/410 |
| 3,637,357 A | * | 1/1972 | Nixon | C10L 1/32 44/301 |
| 3,850,586 A | * | 11/1974 | Iwama | C10L 7/02 44/270 |
| 4,744,796 A | | 5/1988 | Hazbun et al. | |
| 5,743,922 A | | 4/1998 | Peter-Hoblyn et al. | |
| 6,302,209 B1 | * | 10/2001 | Thompson, Sr. ... | B01F 17/0028 166/305.1 |
| 9,137,988 B2 | * | 9/2015 | Zhu | A01N 25/30 |
| 2007/0036832 A1 | * | 2/2007 | Williams | A01N 47/12 424/405 |
| 2011/0296746 A1 | * | 12/2011 | Hernandez Altamirano | C07C 227/26 44/404 |

FOREIGN PATENT DOCUMENTS

| | | | | |
|---|---|---|---|---|
| JP | S49108106 A | 10/1974 | | |
| WO | WO-2011026800 A2 | * | 3/2011 | ............. A01N 25/30 |
| WO | WO-2012150343 A1 | * | 11/2012 | ............... C11D 1/62 |

OTHER PUBLICATIONS

SciFinder Search History (Year: 2021).*
EPO, European Extended Search Report issued in European Application No. 18171155.7, dated Sep. 25, 2018.
EPO, International Search Report issued in International Application No. PCT/EP2019/061348, dated Jul. 2, 2019.
Database Week 197552, Thomson Scientific, London, GB; AN 1975-85189W, XP002784823, & JPS49108106A, abstract.
Pomogailo, A.D., et al. "Monomeric and Polymeric Carboxylic Acids", Macromolecular Metal Carboxylates and Their Nanocomposites. Springer Series in Materials Science, 2010, p. 7-25, vol. 138, Springer, Berlin, Heidelberg.

* cited by examiner

*Primary Examiner* — Pamela H Weiss
(74) *Attorney, Agent, or Firm* — Lorenz & Kopf, LLP

(57) ABSTRACT

The present disclosure relates to diesel fuel emulsions, a process to make them and the use thereof in a combustion process. The emulsions are comprise a surfactant of formula

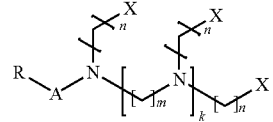

wherein
R is a C5-C22 linear or branched, saturated or non-saturated, substituted or unsubstituted hydrocarbon group, A is

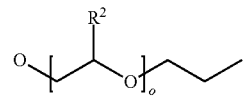

or $CH_2$, each X, independently, is H, COOM or $SO_3M$, with at least one X in the molecule being COOM or $SO_3M$, each $R^2$, independently, is H, $CH_3$, or $C_2H_5$, k=0-3, each m, independently, is about 2-6, each n, independently, is about 1-6 and the alkylene formed when n>1 may be substituted with alkyl groups, o=0-40, and each M, independently, is selected from H and any cation $M^+$.

17 Claims, No Drawings

ALKYLIMINODERIVATIVES FOR USE IN DIESEL FUEL EMULSIONS

CROSS-REFERENCE TO RELATED APPLICATION

This application is a U.S. National-Stage entry under 35 U.S.C. § 371 based on International Application No. PCT/EP2019/061348, filed May 3, 2019, which was published under PCT Article 21(2) and which claims priority to European Application No. 18171155.7, filed May 8, 2018, which are all hereby incorporated in their entirety by reference.

FIELD OF THE DISCLOSURE

The present disclosure relates to the use of amphoteric surfactants in oil-in-water diesel fuel emulsions.

BACKGROUND

A diesel emulsion and its use as a fuel in combustion engines is known. U.S. Pat. No. 4,744,796, for example, suggests to make microemulsions of a hydrocarbon fuel, water and/or methanol and a combination of tertiary butyl alcohol (TBA) and a surfactant. However, the known diesel emulsions have not been fully commercialized and the known emulsions still suffer from too low water content, resulting in too high NOx emissions upon combustion, and/or insufficient stability, and/or use surfactants with an undesirable eco-toxicity profile.

US 2011/0296746 suggests the use of N-alkyl or N-alkenyl or N-cycloalkyl or N-aryl amino or imino propionic acids, at ppm levels, as corrosion inhibitors to protect and prevent the corrosion of ferrous metal in contact with crude oil and liquid fuels.

JPS49108106 (abstract) discloses to use gel-like fuels containing 2-20% water. Such fuels are undesired since they contain too little water to give the desired NOx emissions and a gel-like behavior is undesired since it requires extra measures to be taken to prevent gelation during the actual use of the fuel.

Eco toxicity (including aquatic toxicity and eye irritation profile) of a chemical is classified according to the Directive 91/325/EEC [2] as well as 1999/45/EC. Limits are specified for the application of risk phrases and the "N" symbol (sometimes shown as dead-fish-dead-tree symbol). Conventional surfactants proposed for fuel emulsions currently require the labelling with the dead-fish-dead-tree symbol. Hereinafter a good ecotoxicity (profile) is used for surfactants that do not need to be labelled with the "N" symbol.

It is desired to find an adjuvant or mixture of adjuvants that give the desired fuel emulsions while having a very mild ecotoxicity, such that they do not require the product to be labelled with the dead-fish-dead-tree symbol per the Directive. In addition, other objects, desirable features and characteristics will become apparent from the subsequent summary and detailed description, and the appended claims, taken in conjunction with the accompanying background.

BRIEF SUMMARY

In various embodiments, this disclosure provides A diesel fuel emulsion comprising one or more surfactants of formula

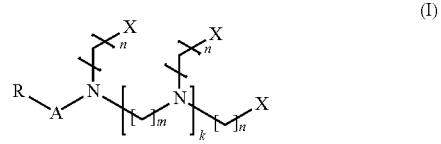

wherein
R is a C5-C22 linear or branched, saturated or non-saturated, substituted or unsubstituted hydrocarbon group,
A is

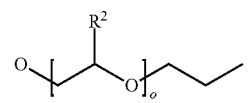

or $CH_2$,
each X, independently, is H, COOM or $SO_3M$, with at least one X in the molecule being COOM or $SO_3M$,
each $R^2$, independently, is H, $CH_3$, or $C_2H_5$,
k=0-3,
each m, independently, is 2-6,
each n, independently, is 1-6, wherein if n>1 then the alkylene group can be optionally substituted with an alkyl group,
o=0-40,
each M, independently, is selected from H and any cation M+, whereby the oxygen attached to said cation is negatively charged and whereby the sum of all positive equals the sum of all negative charges,
in an amount of from about 0.025 to about 10 percent by weight
less than about 65 percent by weight of diesel,
about 35 or more percent by weight of water, and
optional additional components,
up to a total of 100 percent by weight.

The present disclosure relates to the use of one or more particular amphoteric surfactants. These surfactants have an isoelectric point and outside this point they are either in the cationic or anionic state. In an embodiment they are used at a pH which is not the isoelectric point. The amphoteric surfactants as claimed were found to perform very well as surfactants in oil-in-water diesel fuel emulsions.

The surfactants for use in the claimed diesel emulsions have the following general structure:

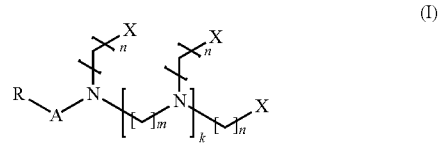

wherein A is

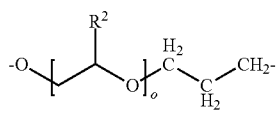

or —CH$_2$—,
each X is, independently, —H, —COOM or —SO$_3$M, with at least one X, in one embodiment all X, in the molecule being COOM or SO$_3$M,
R is a C5-C22 linear or branched, saturated or non-saturated, substituted or unsubstituted hydrocarbon group,
each R$^2$, independently, is H, CH$_3$, or C$_2$H$_5$, suitably H or CH$_3$,
k=0-3, suitably 0 or 1,
each m, independently, is 2-6, suitably 2-4, suitably 2 or 3,
each n, independently, is 1-6, suitably 1-3, suitably 1 or 2, whereby if n>1 the alkylene group —[—C—]$_n$— may be substituted with alkyl groups,
o=0-40, suitably 0-20, suitably 0-10,
each M is, independently, selected from H and any cation M$^+$, suitably an alkaline (earth) metal ion, such as Mg$^{2+}$, Ca$^{2+}$, NH$_4^+$, K$^+$ or Na$^+$, whereby the oxygen attached to said cation is negatively charged and whereby any 2-valent ions or mixtures of ions comprising 2-valent ions, are used in an amount such that the sum of all positive and the sum of all negative charges is the same, suitably M is selected from K$^+$ or Na$^+$ for economic reasons and to avoid complex formation.

In an embodiment at least one M is not H.

In an embodiment RA- is from a natural source, such as derived from oleyl, coco, castor, or tallow fatty acids.

In an embodiment RA is lauryl, (iso)tridecyl or (iso)dodecyl.

In an embodiment RA is a C6-C10 linear or branched, saturated or non-saturated hydrocarbon group because such products were found to be easily synthesized, very effective and have a favourable ecotoxicity profile.

In an embodiment the surfactant is used at a pH<7 where the product is in the cationic form with all M=H and one or more of the nitrogen atoms being protonated. At this pH a suitable counter ion X$^-$ is present, which can be any negatively charged ion, for example Cl$^-$, CH$_3$—O—SO$_3^-$, CO$_3^{2-}$, or HCO$_3^-$ in an amount to have a formulation wherein the total of positive and negative charges is equal.

The products can be made in a conventional way by reacting an amine or polyamine, suitably a (poly)amine with a primary amine group, with acrylic acid (such that n=2 and the ethylene moiety defined by n is not substituted), methacrylic acid (n=2 and the ethylene group is substituted with a methyl group), typically followed by adjusting the pH. Products produced in this way have the advantage that they are salt-free, which is a benefit since it makes aqueous formulations of the products less corrosive, which is an advantage, particularly in fuel emulsions.

In an embodiment, the surfactant is used in its pure form. However, to improve handling, a solvent can be used. The solvent is suitably selected from water, alcohols, glycols, ethers, and mixtures thereof. In an embodiment, dipropylene glycol methylether is used as a solvent. In an embodiment ethylene glycol is used as a solvent. In an embodiment a mixture of dipropylene glycol methylether and ethylene glycol is used as a solvent.

It was found that the use of the surfactants of formula (I) allows the formulation of emulsions with a higher water content than conventional diesel fuel emulsions, resulting in an even lower NOx emission upon combustion. Particularly since a large amount of surfactant is used in the fuel emulsions as claimed, it is advantageous to use a surfactant with a good ecotoxicity profile. Also, since the emulsions are to be used in fuel systems which requires precise pumping and metering, they should preferably not be gelled.

DETAILED DESCRIPTION

The following detailed description is merely exemplary in nature and is not intended to limit the disclosure or the application and uses of the disclosure. Furthermore, there is no intention to be bound by any theory presented in the preceding background of the disclosure or the following detailed description.

The present disclosure generally relates to the use of amphoteric surfactants of the formula I above as a surfactant in oil-in-water diesel fuel emulsions. The use of the surfactants as claimed results in desired fuel emulsions, with high water content, good stability (physical stability, i.e. stability of the oil droplet size), and little corrosion, while having a very mild ecotoxicity, such that they do not require the product to be labelled with the dead-fish-dead-tree symbol per the Directive.

The fuel emulsions described herein are typically white, which sets them apart from known clear micro-emulsions. In an embodiment the emulsions are opaque. The emulsions were found to have a D[4,3] of from about 0.2, about 0.5, about 1, about 2, about 3, or about 4 µm up to about 50, about 20, about 10, about 9, about 8, about 7, about 6, or about 5 µm, with a D$_{50}$ (or D[v,0.5]) in the same range, when determined using a Malvern and Laser Diffraction. In an embodiment the emulsions have a stability of at least about 5 minutes, about 10 minutes, about 20 minutes, about 1 hour, about 2 hours, about 4 hours, about 8 hours, about 16 hours, about 32 hours, or about 48 hours. Stability is define herein to be acceptable when about 250 ml of the emulsion in a graduated glass cylinder of about 30 cm height is not forming a separation layer of more than about 5 mm when standing at about 25° C. for the time indicated. Since the emulsions are easily produced, they are suitably produced right before combustion. Suitably the emulsion are produced about 5 minutes, about 10 minutes, about 20 minutes, about 1 hour, about 2 hours, about 4 hours, about 8 hours, about 16 hours, about 32 hours, or about 48 hours before they are combusted.

The group R is a C5-C22 linear or branched, saturated or non-saturated, substituted or unsubstituted hydrocarbon group. In an embodiment R is from a natural source, such as derived from oleyl, coco or tallow fatty acids. In an embodiment R is alkyl. In an embodiment R is lauryl, (iso)tridecyl or (iso)dodecyl. In an embodiment the group R is a hydrocarbon group substituted with one or more OH groups, as in castor oil-derived products. In an embodiment R is a C5-C10 linear or branched, saturated or non-saturated hydrocarbon group because such products were found to be easily synthesized and very effective. In an embodiment the C5-C10 hydrocarbon is alkyl.

In an embodiment R is (iso)decyl, 3-propylheptyl, or 2-ethylhexyl.

In an embodiment the moiety R-A- is a C6-23 alkyl group or an oxyalkylated C5-22 alkyl group.

In an embodiment, the surfactant is Ampholak® YCE (sodium coco propylene diamine propionate) ex AkzoNobel®.

In an embodiment, the surfactant is Ampholak YJH (coco imino dipropionate) ex AkzoNobel.

The surfactants as claimed are considered to be readily biodegradable, mild to skin, eyes, and aquatic life when compared to other surfactants, particularly alkylamine ethoxylates. In an embodiment the surfactants as claimed need not to be labelled with the dead-fish-dead-tree symbol.

Diesel fuels are defined to be fuels suitable for use in diesel engines. In an embodiment it is a Marine Gas Oil (MGO) or Marine Diesel Oil (MDO) such as Shell® 99. Typically diesel is a mixture of various hydrocarbons, including aliphatic and cyclic hydrocarbons and paraffins with a boiling point of about 150-600° C., suitably about 170-390° C. Typically such fuels are derived from fractional distillation of petroleum. However, herein the term is also used for the diesel fuels comprising more or less biodiesel: biomass to liquid (BTL), gas to liquid (GTL) and coal to liquid (CTL) fuels.

One or more other additives can be present in the fuel emulsions containing the surfactants of the present disclosure. They are stabilizers, defoamers, diluents (particularly for heavy fuels to ensure that the fuel is liquid), compatibility agents, biocides (particularly in biodiesel formulations), thickeners, dyes, fragrances, detergents (for injector or valve cleaning), and chelating agents.

The use of a compatibility agent is particularly important if the nitrogen containing surfactant of the present disclosure is not very compatible with the diesel fuel. When using a compatibility agent, it is advantageous that the compatibility agent is a surfactant which also acts as a detergent. The compatibility agent is suitably selected from C6-C12 dimethylamidopropylamines, which is different from the surfactants as claimed, with quaternary ammonium groups. Compatibility agents are suitably used in an amount up to about 50, about 25, about 15, or about 10% by weight, based on the weight of the surfactant.

Stabilizers suitable for use in the emulsions as claimed were found to be cellulose ethers. The cellulose ethers can be methyl cellulose (MC), hydroxyethyl cellulose (HEC), methyl hydroxyethyl cellulose (MHEC), ethyl hydroxyethyl cellulose (EHEC), carboxymethyl cellulose (CMC), methyl ethyl hydroxyethyl cellulose (MEHEC), methyl ethyl hydroxypropyl cellulose (MEHPC), methyl hydroxypropyl cellulose (MHPC), ethyl hydroxypropyl cellulose (EHPC), methyl ethyl hydroxypropyl cellulose (MEHPC), methyl carboxymethyl cellulose (MCMC), ethyl carboxymethyl cellulose (ECMC), methyl ethyl carboxymethyl cellulose (MECMC), aminated derivatives of any of these cellulose ethers which can be quaternized, any hydrophobically modified derivate of any of these compounds, and mixtures of any of all of these cellulose ethers. The cellulose ethers are suitably not crosslinked. The use of a stabilizer was found to be very effective in prolonging the time after which the emulsion shows phase separation. However, because of their polymeric nature they are preferably used in a small amount. The stabilizers are suitably used in an amount of from about 0.001, or about 0.002, or about 0.005 up to about 0.05, about 0.1, about 0.2, about 0.5, about 1, about 2, about 5, about 7.5 or about 10% by weight of the final fuel emulsion. In an embodiment the amount of surfactant is from about 0.002, or about 0.005% by weight of the final fuel emulsion. In an embodiment the amount of surfactant is up to about 2 or about 5% by weight of the final fuel emulsion.

Defoamers, as used as contemplated herein, are typically silicon-based products, such as siloxane polymers. Suitable defoamers are commercially available and include all conventional defoamers. Suitably it is a defoamer selected from the SAG products from Momentive Performance Chemicals, USA, the BC Antifoam products of KCC Brasilon, Foamaster of Cognis, Rhodisol of Rhodia, Break Thru of Degussa, and/or the Surfynol® DF series and the Airase® SSDL™ products of Air Products. The defoamers are suitably used in an amount of from about 0.01 to about 10, in an embodiment from about 0.05 to about 1, in another embodiment from about 0.1 to about 0.5 g/l in the concentrated compositions.

Unlike many other prior art surfactants, the surfactants of the present disclosure showed excellent emulsification of the diesel droplets in water. Nevertheless it can be desired to choose the concentration of the surfactant of the present disclosure in the diesel emulsion to be quite high. The concentration of the surfactants, particularly of surfactants of formula (I), is suitably from about 0.025, about 0.05, about 0.1, about 0.2 or about 0.3% up to about about 10, about 7.5, about 5, about 3, about 2, or about 1.5%, wherein % means weight percent of the surfactant in the final fuel emulsion. In an embodiment the amount of surfactant of formula I is from about 0.2, or about 0.3% by weight in the final fuel emulsion. In an embodiment the amount of surfactant of formula I is up to about 7.5 or about 10% by weight in the final fuel emulsion. Higher surfactant concentrations of greater than about 0.5% by weight are suitably used for emulsions with a fuel concentration of about 50% by weight or more.

The amount of water in the emulsion is from about 35, about 45, about 50, about 55, about 60, or about 65% up to about 85, about 82.5, about 80, about 77.5, or about 75%, wherein % means weight percent of the water in the total emulsion. In an embodiment the amount of water in the fuel emulsion is from about 50 or about 55% by weight. In an embodiment the amount of water in the fuel emulsion is up about to about 85 or 82.5% by weight in the total fuel emulsion.

The remainder is diesel and optional further additives. The diesel content of the final emulsion is suitably from about 15, about 17.5, about 20, about 22.5, or about 25 up to about 40, about 45, about 50, about 55, about 60 or about 65 percent by weight of the emulsion. In an embodiment the amount of diesel in the fuel emulsion is from about 15 or about 17.5 up to about 45 or about 50% by weight since such formulations require lower levels of surfactants and achieve very good NOx reductions upon combustion.

The diesel emulsions as claimed can be produced in any conventional way. Suitably a high shear mixer is used to combine water, diesel, surfactant, and optional further additives. In a suitable process, water and surfactants are first mixed, during which (part or all of) the surfactant can dissolve, in any conventional matter followed by mixing this aqueous stream with diesel fuel in a high shear mixer. Optional additives can be combined with either the aqueous feed or the diesel feed, depending on the ease of processing and the compatibility with either stream. If desired, part of the aqueous stream and part of the diesel stream can be added in any sequence and quantity to the mixer. In an embodiment all, or part of, the aqueous feed and the diesel feed are added to the mixer simultaneously. In an embodiment all, or part of, the aqueous stream or the diesel stream is premixed with part of the other stream before entering the high shear mixer.

The high shear mixer can be a colloid mill, containing a rotor and a stator, where the water/surfactant stream is mixed together with the hydrocarbon stream just before entering the mill head. Those of ordinary skill in the art will realize that there are other ways of creating a high shear mixing, such as for instance in high-pressure homogenizers, such as Manton Gaulin homogenizers, or ultrasonic homogenizers, and the disclosure is not limited to the mixer type. The formation of the emulsion can be in batch, semi-continuous or continuous, as for instance in in-line operations wherein an aqueous stream and a diesel-containing-stream are mixed and the resulting emulsion is directly fed to the engine. For batch operations, high shear mixers from Silverson®, Ultra-Turrax®, and the like, can be used.

The surfactants of the disclosure may also be used with one or more other surfactants such as alkylamine alkoxylates and quaternary compounds derived therefrom, anionic surfactants such as sulfates and sulfonates from alcohols and alkoxylated alcohols, phosphate esters and ethoxylated phosphate esters, nonionic surfactants such as alcohol alkoxylates and alkyl (C6-C18) polyglucosides, and silicone surfactants. In an embodiment the surfactants of formula I are combined with one or more other surfactants such that the resulting mixture does not need to be labelled with the dead-fish-dead-tree symbol.

It was found that a further advantage of any of the surfactants/adjuvants of formula I is that they can be used without any other surfactant, thus simplifying the formulation. In one embodiment as contemplated herein therefore the one or more surfactants as defined in claim 1 make up at least about 20, about 40, about 50, about 60, about 70, about 75, about 80, about 85, about 90, about 95, or about 100% of all nitrogen-containing surfactants used in the formulation. In an embodiment the one or more surfactant as defined in claim 1 make up at least about 20, about 40, about 50, about 60, about 70, about 75, about 80, about 85, about 90, about 95, or about 100% of all surfactants used in the formulation.

In the case that another surfactant is used together with the surfactants of the present disclosure, it is advantageous that the mixture of the surfactants have low aquatic toxicity and low irritation profiles. Employing the surfactants of formula I, with low aquatic toxicity and low irritation profiles, can reduce the total toxicity of a blend while keeping the efficacy more or less the same even if a not-so favorable surfactant in terms of the aquatic toxicity and irritation profiles is contained in the blend.

All of the surfactants as described herein were found to have the property of allowing the preparation of desirable fuel emulsions, while having a very mild ecotoxicity.

In one embodiment, the fuel emulsions as claimed are used in a conventional combustion engine capable of burning diesel fuels. Suitably they are used in car engines, ship engines, steam engines, and engines in power plants, such as co-generation plants. In one embodiment the fuel emulsions are diesel emulsions and used in ship engines.

In another embodiment they are burned to heat up water or any other medium, merely to generate heat, such as, for instance, in boilers and heaters.

In either embodiment, the emulsions as claimed are suitably diluted with water or any other liquid, such as alcohol, before being burned.

Because of the accurate metering of the fuel emulsion that is needed, the fuel emulsions are preferably non-gelled, meaning that at about 25° C. they do not have a storage modulus (G') that is higher than the loss modulus (G") at a shear frequency in the range of about 0.1 to about 1000 Hz using a conventional rheometer, such as a piezorheometer. Furthermore, gelling of the fuel emulsion could also have an influence on the burning characteristics of the fuel, which is undesired.

Throughout this document, when a ratio or amount is given, it is by weight, unless mentioned differently. Throughout this document, unless indicated differently, the weight percentages of the compositions are based on the total weight of the emulsion, whereby the total weight of the emulsion is about 100 wt %. The term water-soluble is used for materials that dissolve in an amount of at least about 1 g per liter of demineralized water at about 25° C. Where used, the term "consisting" also embraces "consisting substantially", but may optionally be limited to its strict meaning of "consisting entirely". It shall be pointed out that when an amphoteric surfactant appears in the text as a general name without specifying the counterions, it means both its protonated and deprotonated form and salts thereof.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Where upper and lower limits are quoted for a property, for example for the concentration of a component, then a range of values defined by a combination of any of the upper limits with any of the lower limits may also be implied.

It will also be appreciated that features from different aspects and embodiments of the disclosure may be combined with features from any other aspect and embodiment of the disclosure.

The following non-limiting examples are presented to further illustrate and explain the present disclosure.

EXAMPLES

Materials Used:
Ampholak YCE, sodium cocopropylene diamine propionate
Ampholak XCE, coco imino diglycinate
Ampholak YJH-40, C12-imino dipropionate
Lakeland AMA ex Lakeland Chemicals India Ltd, and Librateric AA-30 ex Libra Spec Chem, both coco imino dipropionate disodium salt
Bermocoll® EM 7000FQ, a MEHEC ex AkzoNobel
Water, tap water with a hardness of 10° dH, unless indicated differently.

A fuel emulsion was made at room temperature using 69.75% by weight water, 29.75% by weight of a marine diesel fuel, and 0.50% by weight of surfactant, unless specified differently. Each test was done on samples with a size of 100 ml. First surfactant and water were mixed in a beaker while stirring. Depending on the test, the pH was subsequently controlled. Thereafter the diesel was added while stirring for 20 minutes. Then the resulting mixture was emulsified with a Silverson L4R with a general purpose head for 60 seconds.

Experiment Set 1: Test of pH Influence.
Surfactant used: Ampholak YCE.
The pH of the water/surfactant mixture was adapted with a little NaOH or HCl to be in the range from 1 to 13.

The test showed all emulsions to be suitable since they all had the desired physical properties for at least 15 minutes. However, when stored overnight without stirring, the products with pH 2-8 showed least separation, with pH<7 being the best, and these pH ranges may therefore be preferred for emulsions as claimed.

Experiments 2-4: Test of Influence of Water Hardness.
Surfactant used: Ampholak YCE.
Three experiment were done using tap water (soft water, 3° dH), medium-hard water (10° dH) and hard water (17° dH).

The test showed all emulsions to be suitable since they all had the desired physical properties for at least 15 minutes. However, when stored overnight without stirring, the emulsions made with hard water showed separation and a water hardness from 3-10° dH may therefore be preferred for emulsions as claimed.

Experiments 5 and 6: Test of Influence of Salt.
Surfactant used: Ampholak YCE and Ampholak XCE.
An emulsion was made with each of the surfactants. Both emulsions performed satisfactory, showing that salt (present in the Ampholak XCE) has little influence on the emulsions.

Experiments 7-9: Test of Influence of Water Content.
Surfactant used: Ampholak YCE.
The ratio of diesel:water was varied in these tests. A ratio of about 60:40, 50:50, 40:60, and 20:80 was used. Surprisingly it showed that a product with a water content of 50% or more was stable for 15 minutes, whereas products with less water were not stable for 15 minutes. More surprisingly, the best stability (least separation in 15 minutes) was observed in emulsions containing 60% by weight or more of water. The higher amount of water will lead to less NOx formation upon combustion of the emulsion. The product with 80% water showed foaming.

Experiment 10: Test of Surfactant Concentration.
Experiment 5 was repeated using 0.3% by weight of Ampholak YCE instead of 0.5%. The emulsion was satisfactory, showing that the concentration of the surfactant can be varied to optimize cost/performance.

Experiments 11-12: Test of Influence of Stabilizer.
Two emulsion were made using 54.5% water 44.5% diesel; and 1% Ampholak YJH-40.
In one example 0.1% by weight of the stabilizer Bermocoll EM 7000FQ was added. Both emulsions performed satisfactory. However, the one containing the stabilizer showed better properties showing that the use of a stabilizer may be preferred.

Experiments 13-14: Test of Influence of Amphoteric
Lakeland AMA, and Libraleric AA-30 were used as the surfactant in these examples in an amount of 0.4% by weight. The pH was not controlled.
Good emulsions resulted with a particle size distribution (d10, d50, d90 by volume) of about 2.2, 4.9, 8.8 micron and about 2.1, 4.7, 8.6 micron, respectively, which foamed a little. In such formulations a little defoamer is suitably added to reduce the foaming.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:
1. A diesel fuel emulsion comprising one or more surfactants of formula

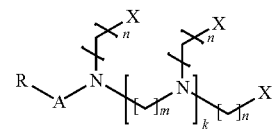

wherein
R is a C5-C22 linear or branched, saturated or non-saturated, substituted or unsubstituted hydrocarbon group,
A is

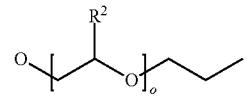

or $CH_2$,
each X is COOM,
each $R^2$, independently, is H, $CH_3$, or $C_2H_5$,
k=0-3,
each m, independently, is 2-6,
each n, independently, is 1-6, wherein if n>1 then the alkylene group can be optionally substituted with an alkyl group,
o=0-40,
each M, independently, is selected from H and any cation M+, whereby the oxygen attached to said cation is negatively charged and whereby the sum of all positive equals the sum of all negative charges,
in an amount of from about 0.025 to about 10 percent by weight
less than about 65 percent by weight of diesel,
about 35 or more percent by weight of water, and
optional additional components,
up to a total of 100 percent by weight.

2. A diesel fuel emulsion of claim 1 wherein each R2, independently, is selected from H and CH3.

3. A diesel fuel emulsion of claim 1 wherein each M, independently, is selected from Mg2+, Ca2+, NH4+, K+ and Na+.

4. A diesel fuel emulsion of claim 1 wherein RA is derived from oleic acid, coco oil, castor oil, tall oil, or tallow fatty acids.

5. A diesel fuel emulsion of claim 1 wherein RA is lauryl, (iso)tridecyl or (iso)dodecyl.

6. A diesel fuel emulsion of claim 1 wherein RA is a C6-C10 linear or branched, saturated or non-saturated hydrocarbon group.

7. Method to make a diesel fuel emulsion of claim 1 by mixing diesel, water, surfactant, and optionally additional components, using a high-shear mixer.

8. Method to make a diesel fuel emulsion of claim 7 wherein the aqueous phase has a pH below 7 and/or the water has a hardness from 3-10° dH.

9. A diesel fuel emulsion of claim 1 wherein
k is 0 or 1,
each m is 2-4,
each n is 1-3, and
o is 0-20.

10. A diesel fuel emulsion of claim 9 wherein
X of the surfactant is COOM,
each R2, independently, is selected from H and CH3,
each M, independently, is selected from Mg2+,Ca2+, NH4+, K+ and Na+.

11. A diesel fuel emulsion of claim 10 wherein each M, independently, is selected from K+ or Na+.

12. A diesel fuel emulsion of claim 11 wherein R-A is lauryl, (iso)tridecyl or (iso)dodecyl.

13. A diesel fuel emulsion of claim 1 wherein
k is 0 or 1,
each m is 2 or 3,
each n is 1 or 2, and
o is 0-10.

14. A diesel fuel emulsion of claim 13 wherein
X of the surfactant is COOM,
each R2, independently, is selected from H and CH3,
each M, independently, is selected from Mg2+,Ca2+, NH4+, K+ and Na+.

15. A diesel fuel emulsion of claim 14 wherein each M, independently, is selected from K+ or Na+.

16. A diesel fuel emulsion of claim 15 wherein R-A is lauryl, (iso)tridecyl or (iso)dodecyl.

17. A diesel fuel emulsion of claim 1 wherein the surfactant has the structure:

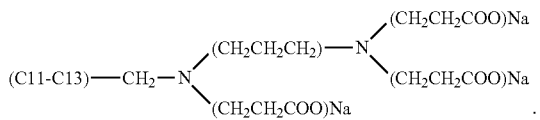

* * * * *